(12) United States Patent
Graham

(10) Patent No.: US 8,002,926 B2
(45) Date of Patent: Aug. 23, 2011

(54) COMPOSITE TUBE PRODUCTION

(75) Inventor: Neil Graham, North Coogee (AU)

(73) Assignee: Quickstep Technologies Pty Ltd., North Coogee, W.A. (AU)

( * ) Notice: Subject to any disclaimer, the term of this patent is extended or adjusted under 35 U.S.C. 154(b) by 36 days.

(21) Appl. No.: 12/556,653

(22) Filed: Sep. 10, 2009

(65) Prior Publication Data

US 2010/0051182 A1    Mar. 4, 2010

Related U.S. Application Data

(63) Continuation of application No. 11/909,161, filed as application No. PCT/AU2006/000382 on Mar. 22, 2006, now abandoned.

(30) Foreign Application Priority Data

Mar. 22, 2005 (AU) ................................ 2005901412

(51) Int. Cl.
   *B65H 81/00* (2006.01)
(52) U.S. Cl. ........ 156/169; 156/173; 156/175; 156/189; 156/195; 156/425
(58) Field of Classification Search .................. 156/156, 156/169, 173, 175, 184, 189, 195, 425; 425/389, 425/393
   See application file for complete search history.

(56) References Cited

U.S. PATENT DOCUMENTS

| | | | |
|---|---|---|---|
| 1,806,861 A | 5/1931 | Owen | |
| 1,872,692 A | 8/1932 | Drake | |
| 2,519,661 A | 8/1950 | Johnson | |
| 2,565,952 A | 8/1951 | Curran et al. | |
| 3,161,919 A | 12/1964 | Renaud | |
| 3,531,357 A * | 9/1970 | Heckly | 156/425 |
| 3,580,795 A | 5/1971 | Eichenlaub | |
| 3,891,489 A * | 6/1975 | Bordner et al. | 156/171 |
| 3,964,958 A | 6/1976 | Johnston | |
| 4,126,659 A * | 11/1978 | Blad | 264/573 |
| 4,190,205 A | 2/1980 | Mitchell | |
| 4,309,232 A * | 1/1982 | McIntosh et al. | 156/64 |
| 4,842,663 A | 6/1989 | Kramer | |
| 4,892,599 A | 1/1990 | Marwick | |
| 5,154,872 A | 10/1992 | Matsui et al. | |

(Continued)

FOREIGN PATENT DOCUMENTS

AU    697678 B2    3/1996

(Continued)

OTHER PUBLICATIONS

Office Action mailed May 27, 2010 in U.S. Appl. No. 11/931,016.

(Continued)

*Primary Examiner* — Jeff H Aftergut
(74) *Attorney, Agent, or Firm* — Baker & Daniels LLP

(57) ABSTRACT

An apparatus for producing tubes formed from fiber reinforced composite material, the apparatus including: an elongate hollow mandrel (3) having an internal mandrel cavity (5), the mandrel having an external surface (7) upon which reinforcing fiber material (9) can be wrapped to provide a composite lay-up (10) supported thereon; and fluid flow means (11) for enabling heat transfer fluid of different temperatures to be circulated through the mandrel cavity (5), such that when fluid at an elevated temperature is circulated, heat is transferred from the fluid, through the mandrel (3) to the composite lay-up (10) for curing or forming said lay-up.

14 Claims, 4 Drawing Sheets

U.S. PATENT DOCUMENTS

| | | | |
|---|---|---|---|
| 5,266,137 A * | 11/1993 | Hollingsworth | 156/156 |
| 5,374,388 A | 12/1994 | Frailey | |
| 5,378,134 A | 1/1995 | Blot et al. | |
| 5,785,760 A | 7/1998 | Sconyers et al. | |
| 5,922,265 A | 7/1999 | Parekh | |
| 5,961,902 A | 10/1999 | Ishitoya et al. | |
| 5,971,742 A | 10/1999 | McCollum et al. | |
| 5,975,183 A | 11/1999 | Reis et al. | |
| 6,160,761 A * | 12/2000 | Sansone | 367/149 |
| 6,485,668 B1 * | 11/2002 | Murphy et al. | 264/516 |
| 6,616,879 B1 | 9/2003 | Kobayashi et al. | |
| 6,835,263 B2 | 12/2004 | Bergmann et al. | |
| 7,060,217 B2 | 6/2006 | Dunton et al. | |
| 7,153,458 B2 | 12/2006 | Ide et al. | |
| 2002/0093120 A1 | 7/2002 | Magni et al. | |
| 2004/0113315 A1 | 6/2004 | Graham | |

FOREIGN PATENT DOCUMENTS

| | | |
|---|---|---|
| DE | 29 11 247 | 10/1980 |
| DE | 4441227 A1 | 5/1996 |
| DE | 20116817 U1 | 1/2002 |
| EP | 0255596 B1 | 11/1990 |
| EP | 0491650 B1 | 5/1995 |
| EP | 1000731 A1 | 5/2000 |
| EP | 1008436 A2 | 6/2000 |
| EP | 0858977 B1 | 8/2002 |
| EP | 1238785 B1 | 4/2004 |
| FR | 2080567 | 11/1971 |
| FR | 2080567 A1 | 11/1971 |
| FR | 2705914 A1 | 12/1994 |
| FR | 2 790 219 | 9/2000 |
| FR | 2 822 749 | 10/2007 |
| JP | 2020338 | 1/1990 |
| JP | 3-009815 A | 1/1991 |
| JP | 9177014 | 7/1997 |
| JP | 10034751 | 2/1998 |
| JP | 11-268067 A | 10/1999 |
| JP | 2004-174929 | 6/2004 |
| WO | WO96/07532 A1 | 3/1996 |
| WO | WO98/53982 A1 | 12/1998 |
| WO | WO00/46015 A1 | 8/2000 |
| WO | WO02/058916 A1 | 8/2002 |

OTHER PUBLICATIONS

Office Action mailed Apr. 2, 2010 in U.S. Appl. No. 12/110,559.
Office Action mailed May 12, 2010 in U.S. Appl. No. 11/994,062.
English language abstract with foreign document.
European Search Report dated Jan. 14, 2011 in European Application No. 10170711.5.

* cited by examiner

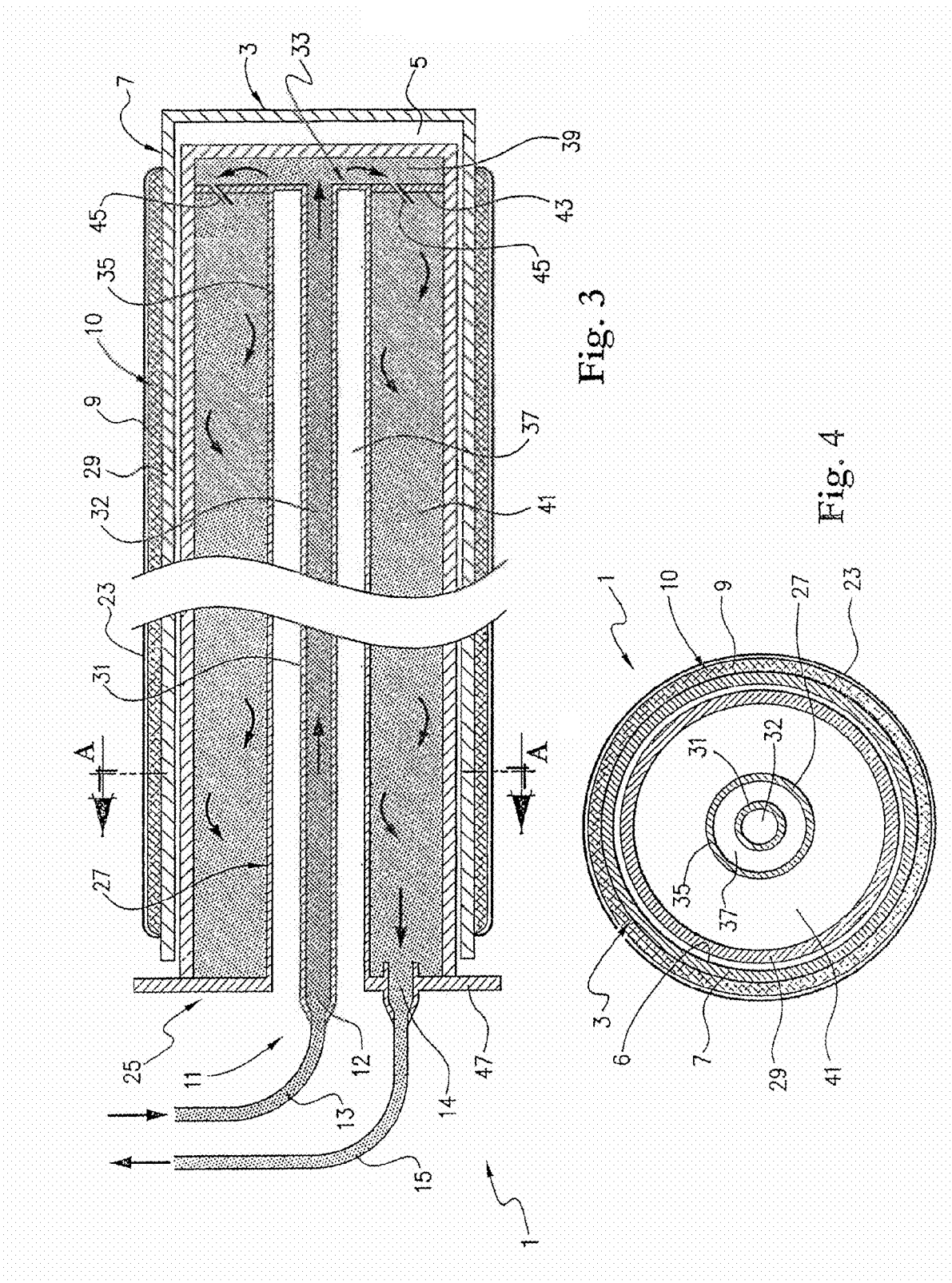

COMPOSITE TUBE PRODUCTION

CROSS REFERENCE TO RELATED APPLICATIONS

This application is a Continuation of patent application Ser. No. 11/909,161, filed Sep. 20, 2007, now abandoned, and is related to and claims the benefit under 35 USC 119 and 35 USC 365 of International Application No. PCT/AU2006/000385, filed Mar. 22, 2006, the disclosures of which are hereby explicitly incorporated by reference herein.

The present invention is generally directed to the production of components made of fiber reinforced composite material, and is in particular directed to the production of tubes and pipes made of such material. While the present invention will be described in relation to the production of cylindrical tubes and pipes, it is to be appreciated that the present invention is also applicable for the production of tapered or curved tubes and pipes, and tubes and pipes of noncircular cross sections.

The term "tube" will be used in the present application to refer to both tubes and pipes or any other elongate hollow component.

High grade fiber reinforced composite components are at present made using autoclaves or ovens such that the curing temperatures and applied pressure can be accurately controlled. In the case of fiber reinforced composite tubes, one process for producing such a tube would be to wrap "prepreg" material, namely woven fiberglass or carbon fiber cloth pre-impregnated with uncured resin around a cylindrical form, compacting the resultant composite lay-up wrap within a vacuum bag, and curing the composite lay-up by placing the entire assembly within a chamber of an autoclave or oven. This method of production is for example described in U.S. Pat. No. 3,962,394 (Hall).

There are several disadvantages in using autoclaves or ovens to cure the composite lay-up. Firstly, the length, width or height of any composite component to be produced is limited by the internal dimensions of the autoclave chamber. Furthermore, as a large gas volume needs to be heated within the autoclave or oven chamber, the temperature only rises relatively slowly within the autoclave or oven chamber. It is nevertheless necessary, in the production of a thick laminate, to limit the rate of increase of the temperature to avoid any uncontrolled exothermic reaction within the resin being cured. This will lead to destruction of the component being produced as well as potentially damaging the autoclave and forming a safety hazard. If such a reaction occurs it is not always possible to rapidly cool the temperature within the autoclave to try to stop the reaction. The temperature must therefore be slowly increased to avoid these potential problems. However, if the temperature does not increase to a high enough temperature, it is possible for the product to remain at least partially uncured. It has been found in a production set-up that it took about 8 hours for a composite tube to be cured within an autoclave or oven depending on the thickness of the laminate being cured.

It is also difficult to use autoclaves on ovens to produce composite components using thermoplastic materials. This is because these materials can reach a liquid state and it is necessary to quickly cool the component to retain the structural integrity of the composite component being produced. Autoclaves and ovens generally take too long to cool limiting their use for thermoplastic materials.

It would be advantageous to be able to produce tubes formed of fiber reinforced composite material without having to use an autoclave or oven. This avoids the disadvantages associated with the use of autoclaves and ovens.

It would also be advantageous to be able to produce tubes formed of fiber reinforced composite material more quickly than would be the case when autoclaves or ovens are used.

Furthermore, it would be advantageous to be able to form tubes of fiber reinforced material using either a cured resin or thermoplastic matrix.

It is therefore an object of the present invention to be able to produce a tube formed of fiber reinforced composite material without the need for an autoclave or oven.

With this in mind, according to one aspect of the present invention, there is provided an apparatus for producing tubes formed from fiber reinforced composite material, the apparatus including:

an elongate hollow mandrel having an internal mandrel cavity, the mandrel having an external surface upon which reinforcing fiber material can be wrapped to provide a composite lay-up supported thereon; and fluid flow means for enabling heat transfer fluid of different temperatures to be circulated through the mandrel cavity, such that when fluid at an elevated temperature is circulated, heat is transferred from the fluid, through the mandrel to the composite lay-up for curing or forming said lay-up.

The reinforcing fiber material may be provided by woven sheets or bundles of fiberglass, carbon fiber, kevlar filaments pre-impregnated with thermosetting resin and/or may be dipped into a resin bath to wet the material immediately prior to wrapping. The resin is cured by the heat transferred from the fluid.

Another type of reinforcing fiber material that may be used in the apparatus according to the present invention uses thermoplastics to provide the matrix for the reinforcing fiber. The thermoplastics may be in the form of filaments comingled with the reinforcing fiber or may be in the form of a thermoplastic powder mixed into the reinforcing fiber. The company Saint-Gobain Vetrotex produces a material under the name "Twintex" (trade mark). This material is composed of fine, homogenous comingled continuous glass filaments and thermoplastic, preferably polypropylene, filaments. These filaments are woven into a sheet which can be readily wrapped around the mandrel of the invention. Heat transferred from the circulating fluid can melt the thermoplastic filaments which then wet out the glass filaments. Fluid at a cooler temperature can then be circulated to solidify the thermoplastic matrix.

It is also envisaged that the reinforcing fiber material be provided by thermoplastic sheets or strips which may be stretched over the mandrel and heated when wrapped on the mandrel. The heating of the thermoplastic material may be achieved in the same manner by circulating heat transfer fluid through the mandrel cavity. This has the effect of melting the outer surface of the thermoplastic material so that the various layers can bind together while at the same time leaving the interior of that material unmelted or only partially melted to provide the necessary reinforcement. The stretching of the thermoplastic acts to orientate the polymer chains within the unmelted material which then provides the necessary fiber reinforcement for the final composite component.

Fluid such as oil, PAG (polyalkylene glycol), or PEG (polyethylene glycol) is a more efficient heat transfer mechanism than air and can more quickly transfer heat to and from the composite lay-up. Fluids at differing temperatures may be circulated through the mandrel cavity to thereby enable relatively quick heating and subsequent cooling of the composite component. This results in faster production cycle times than are possible using autoclaves or ovens where the temperature changes will be at a relatively slower rate. This leads to significant cost and time savings in the production process using the apparatus according to the present invention. Quick cooling of the composite lay-up helps to avoid or minimize damage from any possible uncontrolled exothermic reaction within a thermosetting resin. This apparatus can therefore reduce the time to fully cure the composite tube. In experiential tests conducted with an example embodiment of the apparatus using fiber reinforced material impregnated with epoxy resin, composite tubes have been fully cured in about seven minutes. The present invention therefore takes much less time to cure the composite tube than in an autoclave or oven.

It is also essential that rapid cooling of the composite lay-up can occur when fiber reinforced materials including thermoplastic are used. If the material is not rapidly cooled, the thermoplastic material could be lost from the reinforcing fiber material once it moves into a liquid state. Rapid cooling therefore ensures that the thermoplastic fiber reinforced material is properly formed.

The external surface of the mandrel may be cylindrical with a uniform diameter or may be tapered such that the diameter at one end of the mandrel is greater than the diameter at an opposing end of the mandrel. It is however also envisaged that the external surface provide other cross-sections, for example, square, rectangular, oval, elliptical, or triangular or other noncircular cross-sections. This will enable tubes of different cross-sections to be produced. The present invention is also applicable for curved tube production.

The mandrel may be formed from metal tubes formed from aluminum or steel to facilitate the heat transfer therethrough from the circulating fluid to the composite lay-up. Furthermore, the difference in the coefficient of expansion between the metal of the mandrel and the composite lay-up means that the mandrel will maintain contract during the heating stage of the process, and then separate from the cured composite tube during the cooling stage of the apparatus. This makes it very easy to remove the composite tube from the mandrel at the end of the curing or forming process.

The liquid flow means may include at least one inlet and outlet port for the mandrel cavity. The inlet and outlet ports may be located on a plate secured to a flange provided at an open end of the mandrel. The mandrel cavity may extend at least substantially through the length of the mandrel from the open end thereof and may be closed off at the opposing end thereof. A pipe may extend into the mandrel cavity from the inlet port to allow liquid to be transferred to the peripheral end of the mandrel cavity before circulating back through the chamber to the outlet port. It is also envisaged that a said inlet port be provided at one end of the mandrel and a said outlet port be provided at the opposing end of the mandrel.

The mandrel cavity may extend substantially the entire length of the mandrel such that the entire wrapped composite lay-up can be uniformly heated and cured or formed. It is however also envisaged that the mandrel cavity through which the fluid can be circulated can extend along only a portion of the length of the mandrel, or that insulated end sections be provided at one or both ends of the mandrel. This may be desirable for example where the peripheral ends of the composite tube formed using a thermosetting resin needs to be left uncured or only partially cured. Other fiber reinforced composite components or even other composite tubes can then be joined to the ends of the tube using the co-curing methods described in the Applicant's International patent application PCT/AU01/00224, details of which are incorporated herein by reference. For example, flanges can be joined at the ends of the tube, with the Applicant's co-curing method ensuring that the flange and tube are cured together thereby providing an integrated joint having a uniform material proportion without any joint line discontinuity. Where the tube has a thermoplastic matrix, it is envisaged that the thermoplastic can be reheated and melted and reformed at the end of the tube to thereby allow flanges or another composite tube to be joined to the tube end. It is also envisaged that the flange could be integrally formed at the ends of the composite tube during the curing or forming process.

The inlet and outlet ports can be connected to an external fluid supply system to enable the fluid to be circulated through the mandrel. This fluid supply system may include a series of tanks accommodating fluid at different temperatures and a flow control system for controlling the flow of fluid from and to each tank. Such a system is for example described in the Applicant's Australian Patent No. 697678, details of which are incorporated herein by reference. In the case of the production of tubes having a thermoplastic matrix, only one or two tanks may be required because the tubes can be allowed to cool naturally outside the production plants. This has the advantage of faster cycle times for producing such tubes.

While significant reductions in production time can be achieved using the apparatus as hereinbefore described, it would be further advantageous to be able to eliminate the need to constantly connect and disconnect the inlet and outlet ports of the apparatus to the liquid supply system.

Therefore, according to another preferred embodiment, the fluid flow means may include an inner body having a body chamber through which fluid can be circulated. The inner body can be accommodated within the mandrel cavity, and the inner body may have an outer wall which is closely adjacent to and generally in contact with the wall surface of the mandrel cavity when accommodated therein. The mandrel may therefore fit like a sleeve over the inner body, such that heat may be transferred between the outer wall of the inner body and the wall surface of the mandrel cavity. The inlet and outlet ports may be located at one end of the inner body and may be connected to the liquid supply system. A series of mandrels could then be used, with each mandrel being pre-wrapped in advance with fiber reinforced material away from the production plant area. Each mandrel may then be respectively slid onto the inner body at the commencement of the production process, and slipped off the inner body at the conclusion thereof. Each mandrel may be of a simple construction, for example, a thin walled tube. This arrangement eliminates the need to continually connect and disconnect the inlet and outlet ports at the start and end of each production process.

The outer wall of the inner body may be made of metal such as aluminum or steel to facilitate the heat transfer to the mandrel. If the same material is used for both the outer wall of the inner body and the mandrel, then both the inner body and the mandrel cavity must be machined to a high tolerance to prevent binding of the inner body within the mandrel cavity. However, if different metals used for the mandrel and the inner body, with each metal having a different coefficient of expansion, then the outer wall of the inner body may partially lose contact with the wall surface of the mandrel cavity when cool fluid is being circulated through the inner body to cool the composite component after the curing thereof. This can affect the efficiency of the heat transfer. To this end, at least the outer wall of the inner body may be formed of a resiliently deformable material. Therefore, according to another preferred embodiment, the outer wall of the inner body may include a resiliently deformable wall. The fluid circulating through the body chamber may be pressurized to ensure that the inner body outer wall can expand outwardly to thereby remain in contact with the wall surface of the mandrel cavity throughout the entire production process. Evacuation of the fluid from the inner body may result in the inward bowing of the outer wall facilitating the release of the inner body from the mandrel cavity. The mandrel may include an expansion joint extending along its length. This enables the width of the mandrel to expand when the inner body provides sufficient pressure to the mandrel. This allows a tensile force to be applied to the composite lay-up as required during the production process. This helps to further compact the composite lay-up leading to improved material characteristics of the final composite tube. Vibrations may also be used to facilitate compaction of the lay-up.

It is also envisaged that the mandrel may be split along its length into two or more sections. This facilitates the use of the mandrel for the production of tubes that are not straight and may have crooked portions as the mandrel could be more readily extracted from the cured or formed tube.

The inner body may include an inner rigid core for supporting the resiliently deformable outer wall. The outer wall may be typically formed of material such as high temperature resistant rubber such as EPDM or silicon rubber. Other resilient materials for use in this application are also envisaged. The inner core may support an inlet port and an outlet port and may be made from material such as steel. The use of the material such as aluminum is also envisaged. The inner core may include a central inner tube surrounded by an outer cylinder, and an inner flange extending laterally out from and supporting an end of the outer wall. An air gap may therefore be provided between the inner tube and outer cylinder to act as an insulator and minimize heat transfer therebetween. The outer resiliently deformable wall may be supported by the inner flange around the outer cylinder with a fluid flow gap being provided therebetween to allow fluid flow through the gap. Fluid may then be delivered through the inner tube and out into the gap. The inner flange may be located at the opposing end of the inner core to the inlet and outlet port and of the inner core. Fluid discharge jets may be supported on the flange and may guide fluid exiting the central inner tube into a spiral path through the fluid flow gap. This maximizes the degree of heat transfer through the outer wall. Alternatively, or in addition, a series of outlet ports may be provided along an opposing outer flange provided at the port end of the inner core to induce or support the spiral flow of the fluid. In an alternative embodiment, the inner tube may end with a hooked portion that enters into the fluid flow gap through an opening in the outer cylinder. This eliminates the need for the fluid discharge jets as the fluid exiting from the hooked portion of the inner tube may be directed to induce this spiral flow of fluid through the fluid flow gap. When the fluid is supplied at an elevated temperature and pressure, the heat may be transferred through the resiliently deformable outer walls to the mandrel. Furthermore, the outer wall may expand under pressure from the high temperature fluid to press tightly against the surface of the mandrel cavity to facilitate optimal heat transfer therebetween.

The wrapped composite lay-up may be initially compacted by using a vacuum bag over the lay-up in a conventional manner. Alternatively, a shrink tape may be wound over the wrapped lay-up to provide the necessary compaction. Typically, mylar tape may be used for this purpose. The use of such a tape also improves the external surface finish of the final composite tube. In the production of larger diameter tubes with thick composite walls, it may be useful to also provide additional means to compact the composite lay-up and, if necessary, to provide additional heat for curing. To this end, an outer sleeve may also be located over the external surface of the composite lay-up. The external sleeve may be simply in the form of a resiliently deformable sheath that can be stretched over the wrapped composite lay-up and mandrel to provide or supplement the compacting of the lay-up. Alternatively, the outer sleeve may provide some of the curing heat. To this end, the outer sleeve may include fluid flow passages to enable fluid at elevated temperature and pressure to be circulated. This can provide an additional external heat source for curing the lay-up.

In a preferred embodiment, the outer sleeve may include an outer rigid tubular wall supporting an inner resiliently deformable wall, with a gap being provided between the outer rigid wall and the inner resiliently deformable wall to allow fluid to be circulated therethrough. To this end, an inlet and outlet port for fluid may be located on the external sleeve. The external sleeve may be located over the mandrel and wrapped composite lay-up with the inner body being located within the mandrel cavity. It is however also envisaged that only the external sleeve be used without the inner body, to cure the composite lay-up. Therefore, heat would be transferred only from the external sleeve to the composite lay-up, with no heat being transferred through the mandrel.

Where both an inner body having a resiliently deformable outer wall, and an outer sleeve having an inner resiliently deformable wall are used, heat transfer fluid at the same pressure can be circulated through the inner body and the outer sleeve. Both the inner body and the outer sleeve may therefore function as "pressure chambers", with both the inner body and the outer sleeve respectively applying pressure to the mandrel and the composite lay-up. This thereby allows a "balanced pressure" to be applied to opposing sides of the mandrel/composite lay-up. This allows for better compaction of the composite lay-up leading to improved material characteristics as well as ensuring that the composite lay-up is held rigidly preventing deformation of the composite tube while undergoing the curing or forming process. Furthermore, as the matrix reaches a liquid state, the "balanced density" effect as described in the Applicants' International Application No. PCT/AUO2/00078, details of which are incorporated herein by reference, helps to prevent run off of the liquefied material as well as ensuring uniform distribution of the material through the lay-up.

It is also envisaged that the mandrel, which may be segmented into a plurality of elongate sections, may be secured directly to the resiliently deformable outer wall of the inner body using adhesive or mechanical fasteners. The diameter of the mandrel can then be controlled by circulating fluid through the inner body to increase the diameter of the mandrel, or by evacuating the mandrel to reduce the diameter thereof. This facilitates the compaction of the composite lay-up during the production process as well as facilitating the removal of the mandrel from the finished composite tube.

According to another aspect of the present invention, there is provided a method of producing a tube formed of fiber reinforced composite material including:

wrapping around an elongate hollow mandrel having an internal mandrel cavity with reinforcing fiber material to provide a composite lay-up of a generally tubular shape therearound; and circulating heat transfer fluid at elevated temperature through the mandrel cavity to thereby raise the temperature of an external wall of the mandrel and cure or form at least a substantial portion of the composite lay-up.

The method may further include compacting the composite lay-up prior to curing or forming thereof. The lay-up may be compacted by means of a vacuum bag, or by means of a shrink tape wound around an outer surface of the composite lay-up or by means of a resiliently deformable outer sheath. Alternatively or in addition, compaction may be achieved during the production process by means of the pressure applied by the high temperature fluid. Also, vibration may be used to compact the composite lay-up during the production process.

The method may further include locating the mandrel over an inner body through which the fluid is circulated, the inner body being accommodated within the mandrel cavity.

Furthermore, the method may include locating an external sleeve over the composite lay-up, the external sleeve including a passage for circulating fluid at elevated temperature, therethrough.

It will be convenient to further describe the invention with respect to the accompanying drawings which illustrate preferred embodiments of the composite tube production system according to the present invention. Other embodiments of the invention are possible, and consequently, the particularity of the accompanying drawings is not to be understood as superseding the generality of the preceding description of the invention.

In the drawings:

FIG. 3 is a schematic side cross sectional view of a third possible embodiment of an apparatus according to the present invention;

FIG. 4 is a cross sectional view taken along line A of FIG. 2;

In the following description, the same reference numerals are used for corresponding features in each of the described example arrangements for clarity reasons.

Figure 1:
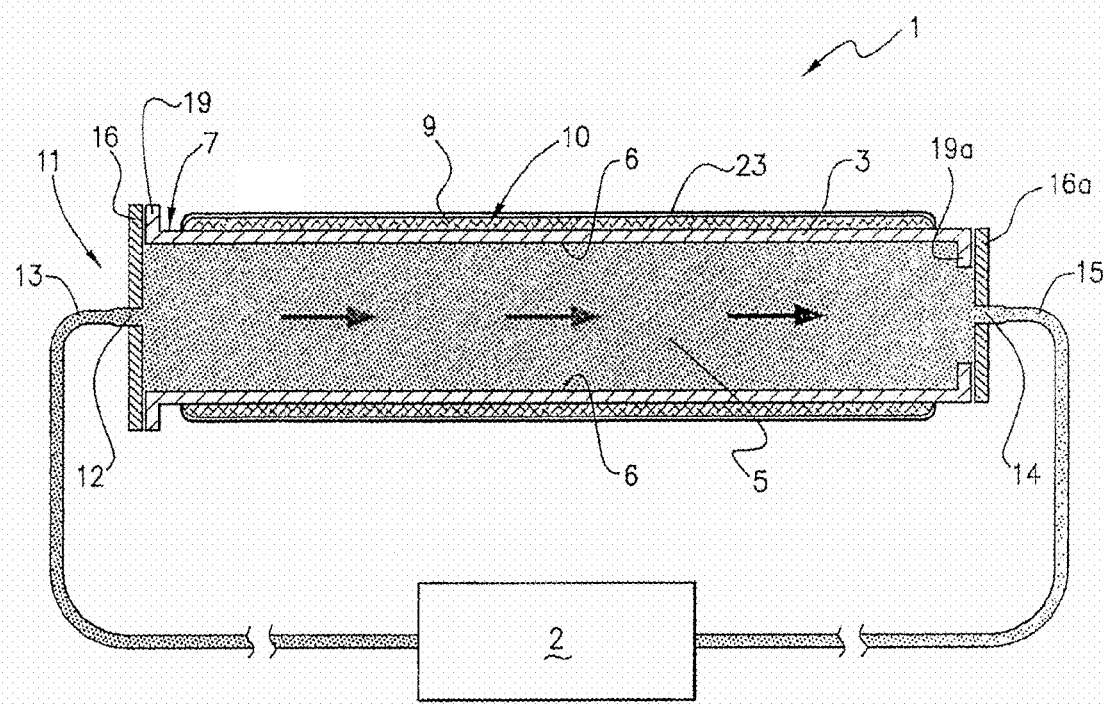
FIG. 1 is a schematic side cross sectional view of a first preferred embodiment of an apparatus for producing tubes formed from fiber reinforced composite material.

Referring initially to FIG. 1, there is shown a first preferred embodiment of the apparatus according to the present invention. This apparatus 1 includes an elongate hollow mandrel 3 having an internal mandrel cavity 5 extending along the length of the mandrel 3. The mandrel 3 has a smooth external surface 7 upon which reinforcing fiber material 9 can be wrapped. This reinforcing fiber material may for example be in the form of sheets of or strips of woven fiber glass or carbon fiber material that have been pre-impregnated with a resin. Alternatively, a resin bath (not shown) may be provided so that the reinforcing fiber material may be dipped into and wetted by the resin immediately prior to wrapping on the mandrel 3.

Another form of reinforcing fiber material that can be used has filaments of thermoplastic comingled with reinforcing fiber filaments such as fiberglass. This material is sold by Saint-Gobain Vetrotex under the name "Twintex" (trade mark). Alternatively, thermoplastic powder, pellets or "prill" may be dispersed through reinforcing fiber to provide the matrix material for the formed composite tube. The reinforcing fiber material may also be provided by thermoplastic material where the "fiber" is provided by the polymer chains within the material. During the heating process, only the outer surface of each sheet or material is melted, the internal portion remaining largely unmelted to form the necessary fiber reinforcement of the finished composite component. Fluid flow means 11 are provided to enable heat transfer fluid from a high pressure fluid supply 2 to be circulated through the mandrel cavity 5. This heat transfer fluid enters the mandrel cavity 5 through an inlet line 13 to an inlet port 12 and exits the chamber through an outlet port 14 through an outlet line 15.

Figure 2:
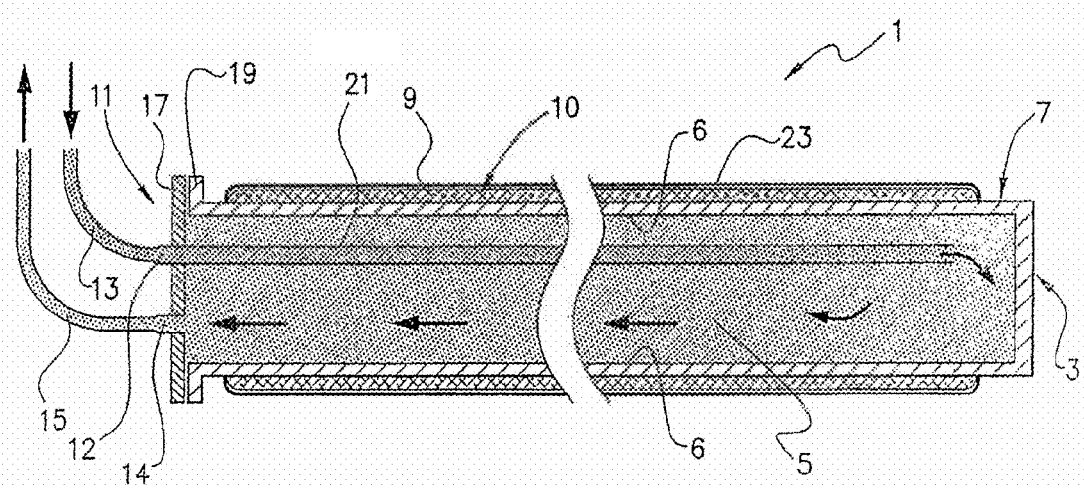
FIG. 2 is a schematic side cross sectional view of a second preferred embodiment of an apparatus according to the present invention.

In FIG. 1, the inlet port 12 is located on a support plate 16 secured to a flange 19 at one end of the hollow mandrel 3, while the outlet ports 14 is located on a second support plate 16a secured to a flange 19a at the opposing end of the mandrel 3. This arrangement however requires the inlet line 13 and the outlet line 15 to be secured and removed from each end of the mandrel before and after each production process. Also, the inlet and outlet ports 12,14 need to be plugged when the lines are removed to prevent the loss of heat transfer fluid from the mandrel cavity 5. Therefore, according to a second preferred embodiment, as shown in FIG. 2, both the inlet and outlet ports 12, 14 are located in the same support plate 17 secured to a flange 19 located at the open end of the hollow mandrel 3. An inlet pipe 21 extends from the inlet port 12 into the mandrel cavity 5 to allow the heat transfer fluid to flow through the entire length of the mandrel cavity 5. The heat transfer fluid may be typically in the form of oil or other liquid such as PAG (Polyalkylene Glycol) or PEG (Polyethylene Glycol).

The mandrel 3 may be manually wrapped or may be supported on a spindle to allow for more rapid and precise wrapping of the reinforcing fiber material 9. Following wrapping of the reinforcing fiber material 9 to form a composite lay up 10 around the mandrel external surface 7, a vacuum bag 23 may be located over the composite lay-up 10 to compact said lay-up prior to curing. Alternatively, a shrink tape can be wrapped around the composite lay-up 10 to compact said lay-up 10.

The composite lay-up 10 is cured or formed by circulating heat transfer fluid through the mandrel cavity 5, with the heat from the heat transfer fluid being transferred through the wall of the mandrel 3 to its outer surface 7 whereat the heat is transferred into the composite lay-up 10 to cure or form the lay-up. At the end of the curing or forming process, heat transfer fluid of a lower temperature is circulated through the mandrel cavity 5 to cool the mandrel 3 and the cured or formed composite lay-up 10. As the composite lay-up 10 has a different coefficient of expansion to the mandrel 3, which is typically made from a metal such as aluminum, the cured or formed composite lay-up 10 will separate from the external surface 7 of the mandrel 3 during the cooling process facilitating removal of the cured or formed composite component therefrom.

FIG. 3 shows a third preferred embodiment according to the present invention. The first and second preferred embodiments requires the inlet and outlet lines 13, 15 to be disconnected after each curing or forming operation. This releases the mandrel 3 and enables the mandrel 3 to then be re-wrapped with the reinforcing fiber material. This is typically achieved by rotating the mandrel on a spindle arrangement while feeding wrapping material over the mandrel. This third embodiment also includes a hollow mandrel 3 having an internal mandrel cavity 5 and an external surface 7 upon which fiber reinforced material 9 can be wrapped. However, to facilitate the manufacturing process, the fluid flow means 11 is provided by an inner body 25 which can be accommodated within the mandrel cavity 5. The heat transfer fluid may be circulated through this inner body 25 while the inner body is located within the mandrel cavity 5. Following the end of the production process, the mandrel 3 can be slid off the inner body 25 and another mandrel 3 pre-wrapped with reinforcing fiber material 9 can then be inserted over the inner body 25 to recommence the production process. As the inlet and outlet lines 13, 15 are connected to this inner body 25, it is unnecessary to disconnect these lines after each curing or forming operation. Also, a number of mandrels 3 can be pre-wrapped prior to curing.

The inner body 25 includes an inner core 27 and an outer wall 29. The inner core 27 supports an inlet port 12 and at least one outlet port 14 thereon. The inlet port 12 is joined to a central inner tube 31 having a flow passage 32 which delivers the heat transferred from the inlet port 12 through to the opposing end 33 of the inner body 25. The central inner tube 31 is surrounded by an outer cylinder 35, with an air gap 37 being provided between the inner central tube 31 and outer cylinder 35 to provide a degree of insulation for the central inner pipe 31. Once the heat transfer fluid exits the central inner pipe 31, it enters a distribution chamber 39 which is separated from a fluid flow gap 41 provided between the outer cylinder 35 of the inner core 25 and the outer wall 29 by an inner flange 43. The heat transfer fluid is delivered from the distribution chamber 39 through fluid discharge jets 45 extending from the inner flange 43 to thereby induce spiral flow of the heat transfer fluid within the fluid flow gap 41. This maximizes the degree of heat transfer from the heat transfer liquid to the outer wall 29. The heat transfer fluid is finally discharged through the outlet port 15. This outlet port 14 is supported on an outer flange 47, and it is envisaged that a series of outlet ports be regularly spaced around the flange 47. This provides a circular arrangement of outlet ports 14 which helps to reinforce or support the spiral flow of the heat transfer fluid through the heat transfer gap 41.

FIG. 4 is a cross sectional view taken along line A in FIG. 3 and better shows the various placements of the components of the apparatus 1 of the present invention. Heat transfer fluid enters from within the central inner pipe 31 through flow passage 32. An air gap 37 separates the central inner tube 31 from the outer cylinder 35 of the inner body 25. A fluid flow gap 41 is provided between the outer cylinder 35 and the outer wall 29 of the inner body 25. The various components of the inner body 25, including the outer wall 29, may be formed of rigid material such as metal including steel or aluminum. According to another preferred embodiment of the inner body 25, the inner core 27 comprising the central inner tube 31, outer cylinder 35 and inner flange 43 may be made from rigid material such as metal. The outer wall 29 may however be made of a resiliently deformable material such as rubber. The advantage of using such resiliently deformable material is that the heat transfer fluid can be pressurized to force the outer wall 29 of the inner body 25 against the inner surface 6 (best shown in FIG. 1) of the mandrel cavity 5. This ensures that the outer wall 29 remains in contact with the mandrel cavity wall 6 throughout the entire curing process. (In FIG. 4, a small gap is shown between the outer wall 29 and the inner surface 6 of the mandrel cavity 5 to make the Figure clearer to understand. It is however to be appreciated that in practice, the outer wall 29 will be in contact with the mandrel cavity surface 6 during the heating and cooling processes, and that there would be no gap).

On the outer surface 7 of the mandrel 3 is wrapped the reinforcing fiber material 9. A vacuum bag or shrink tape 23 then covers the material 9 to compact that material prior to the production process.

The reinforcing fiber material 9 is pre-wrapped around the mandrel 3 away from the production process. This enables a number of mandrels to be pre-prepared for the production process thereby further reducing the overall production time for the process according to the present invention.

Figure 5:
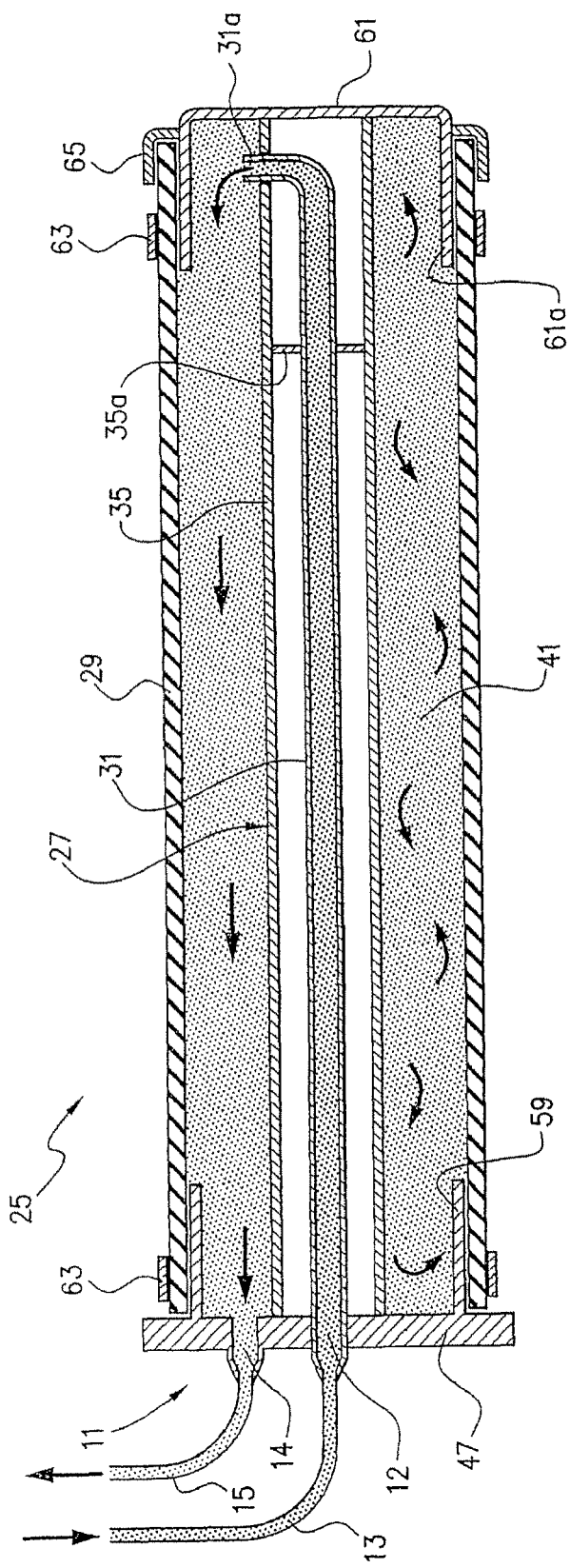
FIG. 5 is a schematic side view of another preferred embodiment of an inner body according to the present invention.

FIG. 5 shows a modified arrangement for the inner body 25 of FIG. 4 which can be constructed from readily available components. The inner. body 25 is similar to the earlier embodiment in having an outlet flange 47 supporting an inlet port 12 and outlet ports 14. An outer wall 29 made of resiliently deformable material is also provided. A central inner tube 31 extends from the outlet flange 47 and terminates in a hooked outlet end 31a which acts to help circulate the high temperature fluid in a spiral path within the inner body 25. The central inner tube 31 is similarly supported within an outer cylinder 35, with an inner annular support and seal 35a holding the central inner tube 31 in a generally coaxial position within the outer cylinder 35. The hooked end of the central tube 31 extends through an opening through the central cylinder into the fluid flow gap 41 located between the outer cylinder 35 and the outer wall 29. The construction is also simplified by using a cylindrical support sleeve 59 extending from the outer flange 47 to support one end of the outer wall 29. The end of the outer wall 29 can be slipped over the support sleeve 59 and held in place by means of a hose clamp 63. An end cap 61 may be provided at the opposing end of the inner body 25 for closing off the opposing end of the outer wall 29. The end cap 61, which can seat on the opposing end of the outer cylinder 35, includes a cylindrical portion 61a upon which the opposing end of the outer wall can be slipped, with another hose clamp 63, holding the outer wall 29 in place. Flange seals 65 may also be provided on the periphery of the end cap 61 to retain and send the peripheral edge of the outer wall 29.

Figure 6:
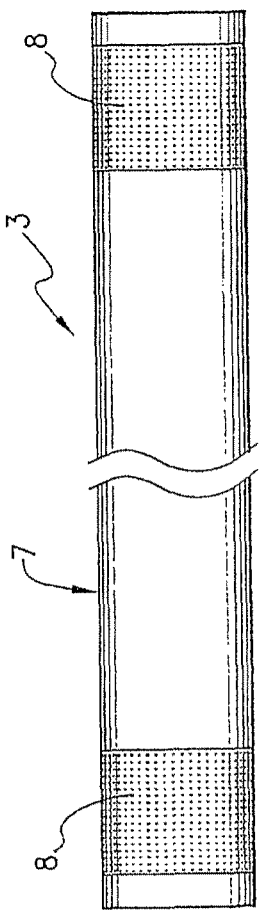
FIG. 6 is a schematic side cross sectional view of a mandrel including insulated ends.

FIG. 6 shows an adapted hollow mandrel 3 having opposing insulated ends 8 that act to restrict the heat transfer through the mandrel at the ends thereof. The insulated ends 8 may be provided by a collar of insulating material, and/or may be provided by a temperature control collar having passages through which a coolant can be circulated. This will have the effect of keeping the ends of the mandrel at a temperature below the curing temperature. This enables composite tubes using reinforcing fiber material having thermosetting resin to be produced where the ends thereof are only partially or entirely uncured. This facilitates the joining of other components such as, for example, flanges to the ends of the composite tube using co-curing processes as described in the applicant's above-noted Australian Patent Application 2001237133. Such an arrangement is not required for composite tubes made with a thermoplastic matrix which can be readily remelted to allow for joining. Therefore, one end of a thermoplastic composite tube may be reheated and melted to allow it to be joined to another thermoplastic component such as a flange or another tube. The ends of the tubes may be heated using a heat source or may be heated using friction by spinning one of the tubes about its elongate axis relative to the other tube while forcing the tube ends together.

Figure 7:
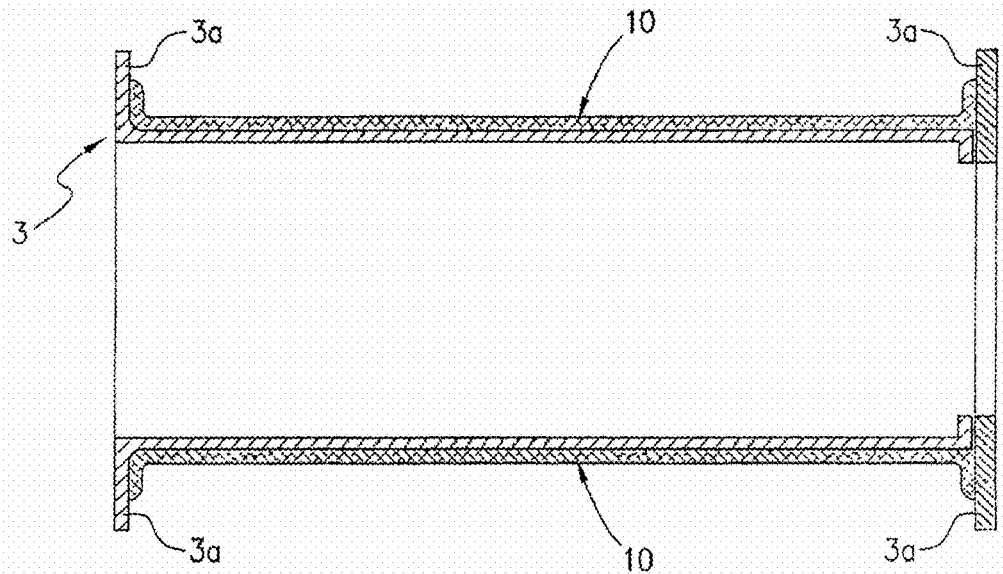
FIG. 7 is a schematic side view of another embodiment of a mandrel according to the present invention.
Figure 8:
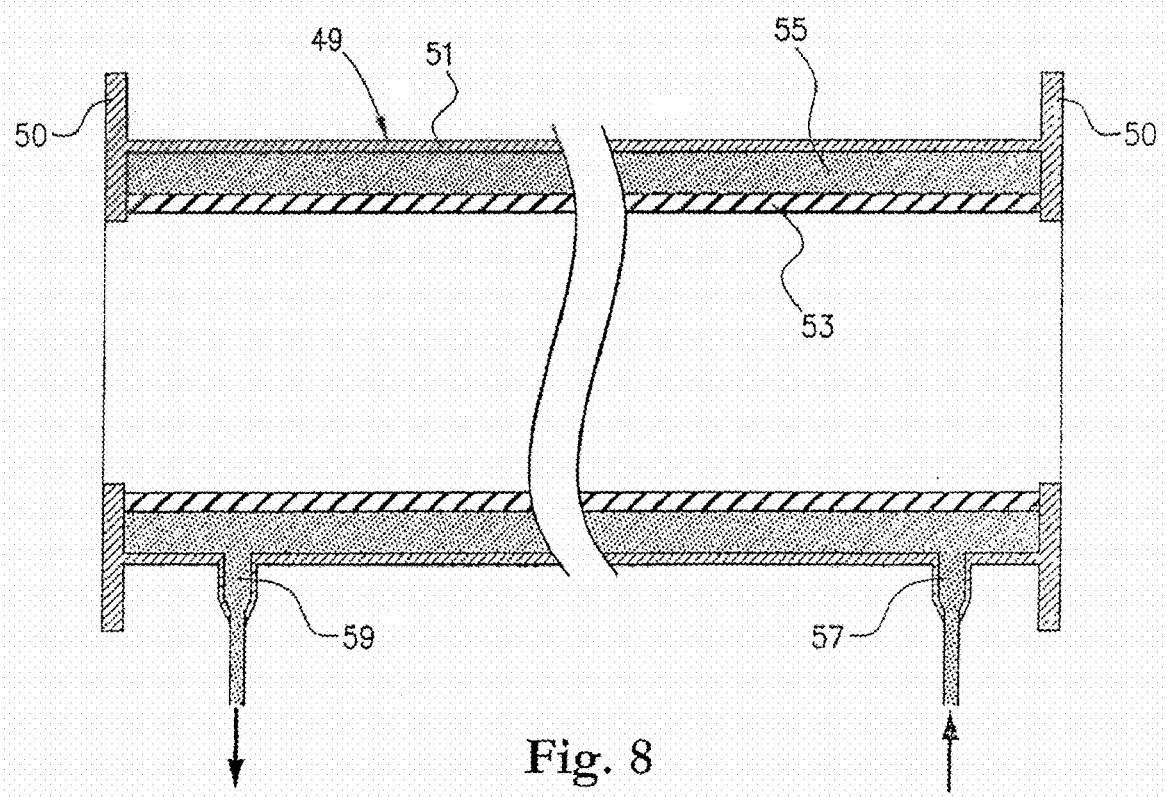
FIG. 8 is a schematic side cross sectional view of an external sleeve according to the present invention.

It is also possible to form a flange integrally with the rest of the composite tube during the production process. This is achieved by providing a flange 3a at one or both ends of the hollow mandrel 3 as shown in FIG. 7, and laying the composite fiber material 10 over the flange surface while the mandrel is being wrapped. In the arrangement shown in FIG. 7, flange 3a Is removably secured to the mandrel to allow the finished composite tube to be removed from the mandrel 3. The flange may then be formed during the production process as an integral part of the composite tube.

Where the wall thickness of the composite tube to be produced is relatively high, typically 10 mm or higher, it may be preferable to further wrap an insulating blanket (not shown) around the composite lay up 9 to help to ensure that the outer most surface of the composite tube is properly cured. The insulating blanket may be formed of conventional insulating materials. Alternatively, the insulating blanket may be formed of a resiliently deformable material such as a rubber which may be stretched over the wrapped composite lay up 10. Such a "sheath" arrangement will of course add to help to further compact the composite lay up 10. It is however also envisaged that a secondary heat source be provided to cure the composite tube. To this end, there is shown in FIG. 8 an outer sleeve 49 for this purpose. The outer sleeve 49 includes opposing flanges 50 between which is supported an outer rigid tubular wall 51. Supported within the outer rigid wall 51 is an inner resiliently deformable wall 53 which is itself supported at opposing ends by the flange, 50. A fluid flow gap 55 is provided between the outer tubular wall and the inner wall 53. Heat transfer fluid may then be supplied through an inlet line 57 connected to one end of the outer tubular wall 15. The heat transfer fluid may be discharged through an outlet line 59 located at an opposing end of the outer tubular wall 51. This outer sleeve 49 can be slid over the wrapped composite lay up 10, and heat transfer fluid may also be circulated through the outer sleeve 49 during the curing or forming process. In this way, heat may be provided to both the internal and external surfaces of the composite lay up 10 at the same time thereby ensuring that the composite lay up 10 is correctly cured or formed. It is however also envisaged that only the outer sleeve 49 need be used to cure or form a composite lay up 10 wrapped on a mandrel 3, with no heat transfer fluid being circulated through the mandrel cavity 5. The outer sleeve 49 can be readily removed from the cured or formed composite tube by pumping the fluid out of the flow gap 55 to draw the inner wall 53 away from the finished tube. It is also envisaged that the outer sleeve 49 can be split along its length into two or more sections. This allows tubes that are nonlinear or crooked to be manufactured.

When both the inner body 25 and the outer sleeve 49 is used, high temperature fluid at the same pressure can be circulated through both the inner body 25 and the outer sleeve 49. This allows both the inner body 25 and outer sleeve 49 to be used as pressure chambers for applying a balanced pressure to be applied to the mandrel 3 and the composite lay-up 9 located thereon.

Modifications and variations as would be deemed obvious to the person skilled in the art are included within the ambit of the present invention as claimed in the appended claims.

The invention claimed is:

1. A method of producing a tube formed of fiber reinforced composite material including:
   wrapping around an elongate hollow cylindrical mandrel having an internal mandrel cavity with reinforcing fiber material to provide a composite lay-up of a generally tubular shape therearound, inserting a fluid flow assembly through an open end of the internal mandrel cavity, the fluid flow assembly including an inner body having a body chamber, and an outer cylindrical wall at least closely adjacent to an inner wall surface of the mandrel when accommodated therein,
   circulating heat transfer fluid at elevated temperature through the body chamber to thereby raise the temperature of an external wall of the mandrel and cure or form at least a substantial portion of the composite lay-up, and removing the fluid flow assembly from the internal mandrel cavity.

2. A method according to claim 1 including further compacting the composite lay-up prior to curing or forming thereof by means of a vacuum bag, a shrink tape or a resiliently deformable outer sheath.

3. A method according to claim 1 including further compacting and applying additional heat to the composite lay-up during curing or forming thereof by means of an outer sleeve having an outer rigid wall and a resiliently deformable inner wall located over the composite lay-up, wherein heat transfer fluid is circulated through a gap provided between said outer and inner walls.

4. A method according to claim 3 including equalising the pressure of the heat transfer fluid circulated through the mandrel cavity and the heat transfer fluid circulated through the outer sleeve to provide a balanced pressure over the composite lay-up.

5. An apparatus for producing tubes formed from fiber reinforced composite material, the apparatus including:
   an elongate hollow cylindrical mandrel having an internal mandrel cavity and an open end thereof, the mandrel having an external surface upon which reinforcing fiber material can be wrapped to provide a composite lay-up supported thereon; and
   a fluid flow assembly removably accommodated within the internal mandrel cavity for enabling heat transfer fluid of different temperatures to be circulated through the mandrel cavity, the fluid flow assembly including an inner body having a body chamber through which fluid can be circulated, and an outer cylindrical wall at least closely adjacent to an inner wall surface of the mandrel cavity when accommodated therein, such that when the fluid flow assembly is inserted into the mandrel cavity through the open end of the mandrel, and when fluid at an elevated temperature is circulated, heat is transferred from the fluid, through the mandrel to the composite lay-up for curing or forming said lay-up.

6. An apparatus according to claim 5, wherein the outer wall is formed of a resiliently deformable material such that the outer wall remains in contact with the inner wall surface of the mandrel cavity when fluid is circulated through the body chamber.

7. An apparatus according to claim 5 wherein the mandrel is in the form of a cylindrical metal tube.

8. An apparatus according to claim 7 wherein the tube includes flanges at opposing ends thereof.

9. An apparatus according to claim 5 wherein the mandrel includes an expansion joint extending along its length.

10. An apparatus according to claim 5 wherein the mandrel is split along its length in at least two separate sections.

11. An apparatus according to claim 5 wherein the mandrel includes opposing insulated end portions for restricting heat transfer at the ends of the mandrel.

12. An apparatus according to claim 5 wherein the fiber reinforcing material is in the form of woven sheets or bundles of reinforcing fiber including fiberglass, carbon fiber or Kevlar, the fiber being impregnated with a thermosetting resin.

13. An apparatus according to claim 5, wherein the fiber reinforcing material is in the form of sheets or bundles of reinforcing fiber including fiberglass, carbon fiber or Kevlar, the fibers being comingled with thermoplastic filaments, powder, pellets or prill.

14. An apparatus according to claim 6 further including an outer sleeve including an outer rigid wall supporting an inner resiliently deformable wall, and means for circulating fluid at elevated temperature and pressure through a gap provided between the outer and inner walls, the outer sleeve being locatable around at least a substantial portion of the mandrel and composite lay-up supported thereon to thereby provide additional heat and pressure to the lay-up.

* * * * *